United States Patent [19]
Crane

[11] 3,977,035
[45] Aug. 31, 1976

[54] PIVOTED DRIVE AND MOUNT FOR MEAT SCRAPING MACHINE

[75] Inventor: Herbert R. Crane, Tipp City, Ohio
[73] Assignee: Hobart Corporation, Troy, Ohio
[22] Filed: Dec. 20, 1974
[21] Appl. No.: 535,037

[52] U.S. Cl. .................................... 15/3.17; 15/77
[51] Int. Cl.² ........................................ A22C 17/08
[58] Field of Search.................. 15/3.13, 3.16, 3.17, 15/3.18, 77, 88, 102, 21 D; 17/1 G

[56] References Cited
UNITED STATES PATENTS

| | | | |
|---|---|---|---|
| 1,670,809 | 5/1928 | Hormel | 15/3.17 |
| 2,784,432 | 3/1957 | Whaley | 15/77 X |
| 3,102,290 | 9/1963 | Sannes | 15/3.17 |
| 3,606,628 | 9/1971 | Russell | 15/3.17 |

*Primary Examiner*—Edward L. Roberts

[57] ABSTRACT

The pivoted mount connecting two opposing sections of a meat scraping machine suspends the movable section for swinging gravity-induced movement toward the stationary section. The stationary section is the sole support for the movable section and wholly encloses the power source for the machine. A drive connection passes into the movable section through the pivoted mount, so the drive system for the entire machine is wholly contained within the two opposing sections, entirely free from exposure to the outside environment. The result is a sanitary drive system for the machine.

11 Claims, 5 Drawing Figures

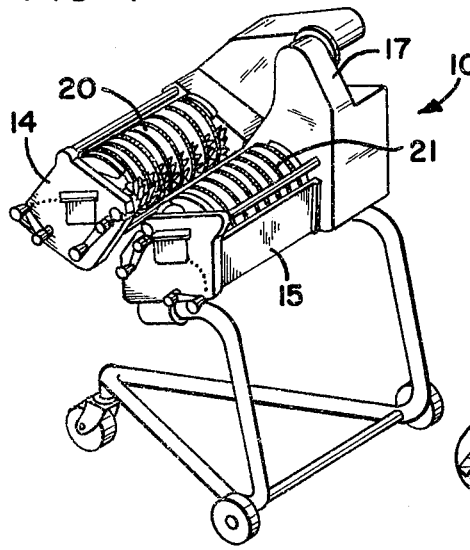
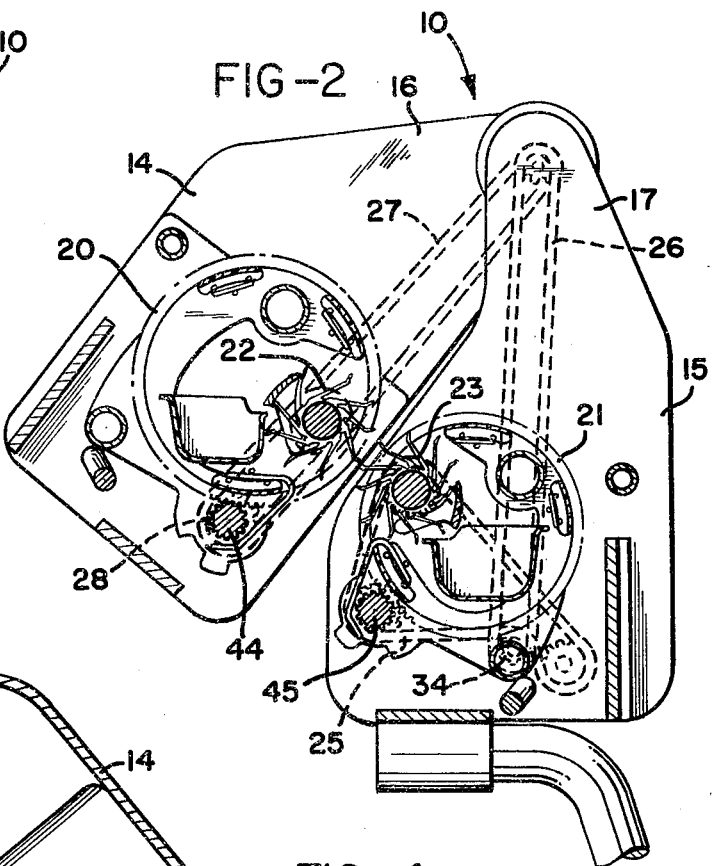
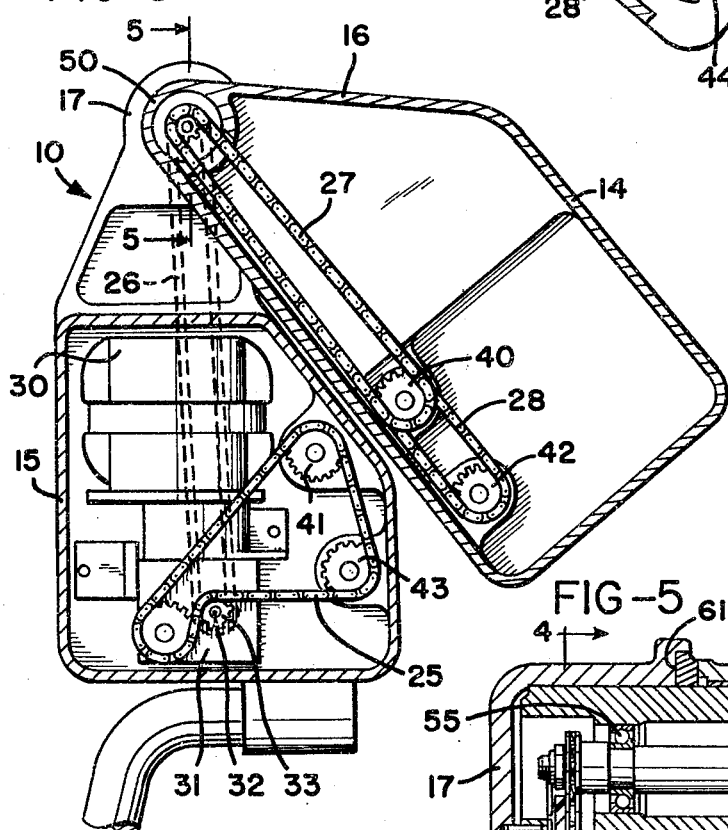
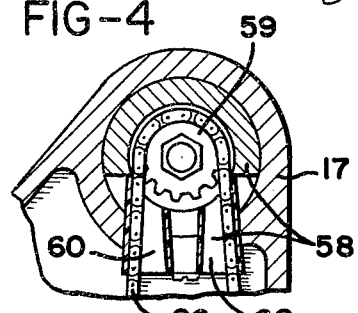
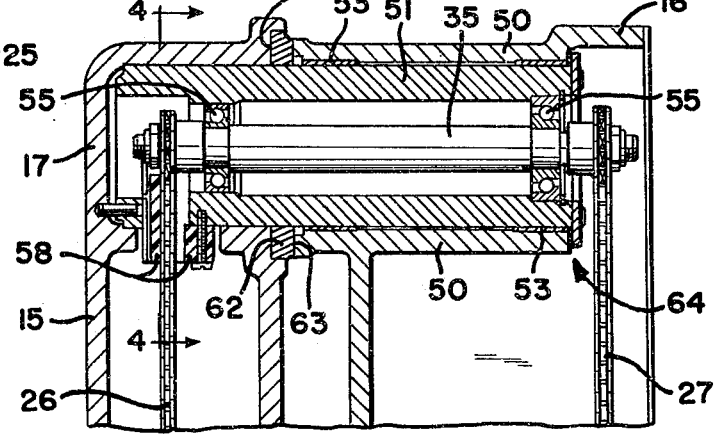

PIVOTED DRIVE AND MOUNT FOR MEAT SCRAPING MACHINE

CROSS-REFERENCE TO RELATED APPLICATIONS

Reference is made to copending U.S. applicatons Ser. No. 566,366, filed Apr. 9, 1975 and Ser. No. 535,041, filed Dec. 20, 1974 both assigned to the assignee of the present invention.

BACKGROUND OF THE INVENTION

This invention relates to meat scraping machines for scraping the freshly cut surfaces of a piece of meat, and more particularly to a pivoted drive and mount for mounting a movable section of such a machine relative to a fixed section and for coupling the drive from one section to the other in a sanitary fashion.

The faces of cut meat have customarily been scraped, washed, or otherwise cleaned for reasons of sanitation and appearance. The meat cutting process, particularly cutting by bandsaw, usually leaves residues of congealed blood, bone dust, marrow, meat particles, coagulated fat, and so on, on the freshly cut meat surfaces, and these residues are unappealing to purchasers as they view the meat in the market. It has therefore been common practice to scrape freshly cut meat manually before it is put on display.

In view of the time and labor involved in manually scraping each piece of meat, it has long been desirable to automate the cleaning process. Until recently, however, most efforts in this direction have been unsuccessful. Foremost among the causes have been the problems of accommodating meats of all sizes and thicknesses, and of meeting the very strict sanitation requirements of the Federal Food and Drug Administration (FDA) and the National Sanitation Foundation (NSF). A successful machine must therefore be highly versatile, thorough, and quick, and it must also be completely sanitary in operation and quickly and easily cleanable after use.

Meat scraping machines such as disclosed in U.S. Pat. Nos. 3,389,414; 3,439,369; 3,478,380; 3,606,628 and 3,781,936 represent significant improvements in automating the cleaning of cut meats and reducing the manual labor and time necessary. U.S. Pat. No. 3,781,936, in particular, discloses a meat scraping machine which has solved a number of prior art problems. It cleans both cut faces of the meat automatically and quickly, and accepts the commonly encountered thicknesses. Most of the manual labor has been eliminated, and the machine produces a product which is highly appealing to the consumer.

In such a machine, where both sides of the meat are simultaneously driven and cleaned, the two machine sections are synchronized, lest one surface of the meat be driven at a speed different from the other. The two sections are also movable with respect to one another so that they may be selectively separated to accommodate different meat thicknesses. As indicated earlier, however, it is necessary that all exposed portions be easily maintainable in a highly sanitary condition. This means that the drive system must be isolated from the external environment since it is all but impossible to clean many of the drive chains, gears, motors, and so on usually employed.

One solution is to use separate, synchronized drive systems within each section, each being separately isolated from the external environment. This is expensive, however, due to the need for two drives, each of which is synchronized. Another solution is to couple the drive systems of the two sections together, making provision for displacement of one with respect to the other to accommodate different meat thicknesses.

SUMMARY OF THE INVENTION

Briefly, the present invention relates to a fully automatic meat scraping machine for removing the residues from the freshly cut surfaces of a piece of meat, and more particularly to the support and drive system for such a machine.

The machine is divided into two opposing sections, each having meat drive means for gripping and driving the meat therebetween. As the meat moves between these sections special scraper blade assemblies remove the residue from the meat surfaces, and the meat is then discharged beneath the machine. More particular details of the machine and the scraper blade assemblies may be found in copending U.S. applications Ser. No. 566,366, filed Apr. 9, 1975, and Ser. No. 553,041, filed Dec. 20, 1974, both assigned to the assignee of the present invention.

The prior art problems are overcome by suspending the movable section from the fixed section for gravitationally biased swinging movement toward the fixed section, and by locating a single power source in the fixed section and drivably connecting it to the movable section by an enclosed driving connection which passes through the movable section support. The drive connection to the movable section is coaxial with the pivoted mount so that relative movement between the two sections is fully and easily accommodated without requiring any displacement or elongation of the drive connection itself. The coaxial configuration of the mount and drive also makes it possible to contain the drive system entirely within the two sections of the meat cleaning machine, fully isolating the drive system from the food processing environment outside the machine. The mechanical coaxial interconnection between the sections also makes it possible to power the movable section of the machine without employing shafts, cables, or wires located outside the machine enclosure.

The present invention thus enables the use of a single, sanitary power source and provides an uncomplicated and sanitary drive connection between the two machine sections. Further, both sections are maintained in full synchronizaton without the need for synchronized motors.

The pivoted support for the movable section includes interfitting tube members above each machine section. The tube members rotate relative to one another about their common axis, and are positioned to support the movable section therebeneath at approximately a 30° angle from the vertical when resting against the stationary section. This arrangement provides gravitational biasing of the movable section toward the stationary section, and automatically limits the gravitational pressure between sections when large cuts of meat are introduced. Other biasing systems, such as springs, may also be used to alter the operating parameters as desired, and may be wholly contained within the machine for optimum sanitation.

It is therefore an object of the present invention to provide a pivoted drive and mount for a meat scraping machine which enables a single power source to be used in one of the machine sections and connects this source to the remaining section or sections in an uncomplicated and highly sanitary fashion; which enables the machine drive to be contained within the machine sections where it is substantially free from exposure to the outside environment; which provides a highly sanitary system which enables the machine to be cleaned easily for rentention in a highly sanitary condition; which is substantially free of interference with movement between the machine sections; and to accomplish the above objects and purposes in an uncomplicated, inexpensive, and highly durable configuration readily suited to application in the food industry.

Other objects and advantages of the invention will be apparent from the following description, the accompanying drawings and the appended claims.

BRIEF DESCRIPTION OF THE DRAWINGS

FIG. 1 is a perspective view of a meat scraping machine incorporating the drive and mount of the present invention;

FIG. 2 is a cross-sectional view of the FIG. 1 machine illustrating the drive connections among the various portions of the machine;

FIG. 3 is a cross-sectional view similar to FIG. 2 looking in the opposite direction;

FIG. 4 is a fragmentary cross-sectional view taken generally on line 4—4 of FIG. 5; and FIG. 5 is a fragmentary cross-section view taken on line 5—5 of FIG. 3.

DESCRIPTION OF THE PREFERRED EMBODIMENT

FIG. 1 shows a meat scraping machine 10 incorporating the pivoted drive and mount of the present invention. Machine 10 includes a left hand section 14 and a right hand section 15 located beneath respective left and right hand connecting portions 16 and 17. Each section 14 and 15 includes respective meat engaging and driving cylinders 20 and 21, scraper blade assemblies 22 and 23, and other machine members as more particularly described in copending U.S. applications Ser. No. 566,366, filed Apr. 9, 1975, and Ser. No. 535,041, filed Dec. 20, 1974.

FIG. 2 is a cross-sectional view taken generally through the meat gripping and driving cylinders 20 and 21 looking back toward the connecting portions 16 and 17. The locations of the various drive chains 25–28 in the left and right hand sections 14 and 15 are shown in phantom.

FIG. 3 is a view similar to FIG. 2 looking in the opposite direction with the rear walls of sections 14 and 15 removed to show the machine drive arrangement.

With particular reference to FIGS. 2 and 3, the main power source for the meat cleaning machine 10 is an electric motor 30 mounted above a gear housing 31 and having a horizontal output shaft 32. An output gear 33 for the right hand portion of the machine (FIG. 3) is attached to one end of output shaft 32 for driving the right hand section drive chain 25. A similar left hand output gear 34 (FIG. 2) is attached to the opposite end of output shaft 32 (on the opposite end of gear housing 31) for driving a right hand coupling chain 26 which travels into the right hand connecting portion 17 of the right hand section 15 to drive a power connecting drive shaft 35. Shaft 35 passes from the right hand connecting portion 17 into the left hand connecting portion 16, and a left hand coupling chain 27 then connects the power connecting drive shaft 35 to the left hand scraper blade assembly 22. A left hand extension drive chain 28 is also driven by chain 27 for driving the left hand meat cylinder 20.

The scraper blade assemblies 22 and 23 are driven by respective left and right hand scraper blade assembly drive gears 40 and 41 (FIG. 3). The meat gripping and moving cylinders 20 and 21 are driven by left and right hand cylinder drive gears 42 and 43, each driving respective left and right hand spline gears 44 and 45 (FIG. 2). Spline gears 44 and 45, in turn, engage the outer toothed peripheries of the individual blade-like elements of the meat cylinders 20 and 21, as more particularly described in U.S. application Ser. No. 535,041, filed Dec. 20, 1974.

The left hand connecting portion 16 has a tubular member 50 formed in the top thereof; an inner tubular member 51 is press fitted into the top of the right hand connecting portion 17 (FIG. 5). Member 51 is fitted to be received in member 50 and carries member 50 for rotational movement thereabout on Teflon bearings 53. A rotating water-tight friction seal is located between the left and right hand connecting portions 16 and 17 and surrounds the tubular member 51. This seal includes a recessed area 61 in the right hand connecting portion 17, a resilient friction material 62, and a smooth surface 63 on the end of the left hand tubular member 50. Axial loading of this friction seal may be accomplished by incorporating some resilient means in the area 64 at the end of the tubular member 51.

Members 50 and 51 are shaped to support the left hand machine section 14 at approximately a 30° angle (FIGS. 2 and 3) with respect to the vertical when sections 14 and 15 are adjacent. Section 14 is thus gravitationally biased toward the right hand section 15. Further, since section 14 pivots about the tubular members 50 and 51, the gravitational bias of the left hand section 14 toward the right hand section 15 varies substantially as the trigonometric sine of the angle by which the left hand section is displaced from the vertical. Thus, as thicker pieces of meat are introduced between the two sections, the force of the gravitational bias will increase only as the sine of the angle of elevation of the left hand section. The increase will not be linear since the relation between an angle and its sine is not a linear function. This non-linear relationship has been found desirable since beyond a certain point increased forces are of less importance in cleaning thicker slices of meat.

The power connecting drive shaft 35 is supported coaxially within tubular members 50 and 51 on ball bearings 55, so that shaft 35 may rotate within the tubular members independently of the left and right hand sections 14 and 15. In the preferred embodiment shaft 35 is rotated so that the net torque transmitted to the movable (left hand) section causes that section to rotate about the tubular members toward the other section, in the same direction as the force of the gravitational bias. Thus shaft 35 rotates counter-clock-wise in FIGS. 2 and 4 and clockwise in FIG. 3. This direction of rotation is also desirable as a safety feature in the event of a machine jam since it assures the rotatable left hand section will not swing upward as a result of machine torque.

FIGS. 4 and 5 illustrate a plastic chain or servicing guide 58 for guiding drive chain 26 onto the sprocket 59 during assembly of the machine. The presence of this chain guide enables the right hand connecting portion 17 to be formed as a single integral casting, eliminating the need for a removable access plate near its top for inserting tools for threading the chain. With the guide 58, the chain 26 is simply inserted into either of the chutes 60 and carried over sprocket 59. Upon emerging on the opposite side, the chain is peeled off the sprocket by the other chute 60 to complete the threading operation.

As may be seen therefore, the present invention provides numerous advantages. The drive system, including motor 30, drive chains 25–28, power connecting drive shaft 35, and so on, is wholly contained within the left and right hand machine sections 14 and 15. Since the drive system is fully enclosed and isolated from the external environment, it provides a highly sanitary drive which is easily cleanable, and may be cleaned with the steam and high pressure sprays commonly employed in food handling areas.

The drive system uses a single non-synchronous drive motor 30, yet maintains both sections fully synchronized. It also allows virtually unencumbered rotational movement of the left hand section 14 relative to the right hand section 15 simultaneously as the meat driving cylinders 20 and 21 convey the meat through the machine, providing what might be termed a "floating" pivotal movement. The coaxial arrangement of the power connecting drive shaft 35 with the pivotal tubular members 50 and 51 permits section 14 to move relative to section 15 without the need for any special compensation within the drive system itself. What little torque is transmitted by the drive system to the left hand section 14 is normally used to assist the gravitational bias between the sections.

The tubular members 50 and 51 support the left hand section in cantilevered fashion from the right hand section at approximately a 30° angle. Then, as ordinary slices of meat cause the machine sections 14 and 15 to separate during passage through the machine, the gravitational bias between the sections increase substantially as the sine of the angle the left hand section makes with the vertical. As the separation between machine sections increases when thicker slices of meat are introduced, the sine function relationship limits the increase in force between the two sections, with the maximum force occurring when the left hand section is brought to a horizontal position.

It would of course be possible to employ springs or counterweights to modify the force between the machine sections. Such modification could, for example, by operator adjustment, add to or subtract from the gravitational bias between the sections in the event meat scraping forces differing from those of the gravitational bias were desired. Springs or counterweights could also be employed as the major determinant of force between the sections, especially if it were desired to orient the sections in some different relationship, such as vertical or horizontal.

It would also be possible to modify the FIG. 1–4 machine by locating the drive motor 30 and its associated gear box in the movable left hand section 15 rather than in the stationary right hand section, as illustrated. Other modifications include using several motors in one or both sections, and/or allowing both sections to pivot from some common support.

Entry of a slice of meat between the sections 14 and 15 causes sections 14 and 15 to separate as previously described. The force impressed on the meat slice by the drive cylinders 20 and 21 during this separation action is momentarily increased beyond the normal bias pressure by the force required to accelerate the section 14 away from section 15. The magnitude of this rotational acceleration force is dependent, among other factors, upon the mass of the movable section 14 and the speed of meat feeding. These additional factors alter the characteristics of the cleaning operation at the edge of a meat slice and in the area around a bone section, and in some specific embodiments of the machine should therefore be considered. In the preferred embodiment, desirable cleaning characteristics are realized by limiting the mass in the movable section 14, using lightweight metals in forming section 14, and by locating the drive motor and gear box in the stationary right hand section 15.

While the form of apparatus herein described constitutes a preferred embodiment of the invention, it is to be understood that the invention is not limited to this precise form of apparatus, and that changes may be made therein without departing from the scope of the invention.

What is claimed is:

1. In a power driven meat scraping machine for cleaning accumulated residue from the sawed faces of a piece of meat, the machine including a first section for cleaning one side of the meat, a second section mounted relative to the first section for cleaning the other side of the meat, and at least one rotational power source located in the first section, the improvement comprising:
   a. means having a rotational axis and mounting the first and second sections for pivoted rotational movement relative to one another about said axis, and
   b. power drive connecting means coaxial with and wholly contained within said mounting means for mechanically connecting the output of the power source in the first section to the second section along said axis and in a sanitary fashion free of exposure to the outside environment.

2. In a power driven meat scraping machine for cleaning accumulated residue from the sawed faces of a piece of meat, the machine including a first section for cleaning one side of the meat, a second section mounted relative to the first section for cleaning the other side of the meat, and at least one rotational power source located in the first section, the improvement comprising:
   a. a pivoting arm assembly mounting and interconnecting the first and second sections for pivoted rotational movement relative to one another,
   b. power drive connecting means within said arm assembly mechanically connecting the output of the power source in the first section to the second section,
   c. said arm assembly including at least one tube member, said tube member attached to an extending from one of the sections, means on the other section for receiving said tube member, said tube member interfitting with said receiving means on the other section for relative rotation about the axis of said tube member to permit swinging movement between the first and second sections about the axis of said tube member, and
   d. said power drive connecting means including a drive shaft coaxially mounted with said tube member for rotation on said axis of rotation.

3. The machine of claim 2 wherein said tube member and receiving means support the second section in cantilevered fashion from the first section.

4. In a power driven meat scraping machine for cleaning accumulated residue from the sawed faces of a piece of meat, the machine including a first section for cleaning one side of the meat, a second section mounted relative to the first section for cleaning the other side of the meat, and at least one rotational power source located in the first section, the improvement comprising:

a. means mounting the first and second sections for pivoted rotational movement relative to one another and gravitational bias toward one another, b. power drive connecting means within said mounting means mechanically connecting the output of the power source in the first section to the second section, c. said mounting means suspending the second section therebeneath at an acute angle with respect to the vertical when the second section is adjacent the first section and d. said mounting means suspending the second section to increase said angle with the vertical when the first and second sections are moved apart, said increasing angle increasing the force of said second section gravity bias toward the first section, said bias increasing substantially as the sine of said angle.

5. The machine of claim 4 wherein said acute angle is approximately 30° when the first and second sections are adjacent.

6. In a power driven meat scraping machine for cleaning accumulated residue from the sawed faces of a piece of meat, the machine including a first section for cleaning one side of the meat, a second section mounted relative to the first section for cleaning the other side of the meat, and at least one rotational power source located in one of the sections, the improvement comprising:

a. pivoting arm assembly means mounting the second section for pivoted rotational movement toward and away from the first section, said arm assembly including a first tube member attached to and extending from the first section and a second tube member attached to and extending from the second section, said first and second tube members interfitting with one another for relative rotation about a common axis to support the second section from the first section and to permit said pivoted movement between the first and second sections, said mounting means suspending the second section therebeneath at an acute angle with respect to the vertical for gravitational biasing of the second section toward the first section, and said mounting means suspending the second section to increase said angle with the vertical when the first and second sections are moved apart, said increasing angle increasing the force of said second section gravity bias toward the first section, said bias increasing substantially as the sine of said angle, and b. power drive connecting means wholly contained within said mounting means for mechanically interconnecting the output of the power source in the one section to the other section in a sanitary fashion, said power drive connecting means including a drive shaft coaxial with and rotatably mounted within said interfitting tube members.

7. The machine of claim 6 wherein said first and second tube members support the second section in cantilevered fashion from the first section.

8. In a power driven meat scraping machine for cleaning accumulated residue from opposed sawed faces of pieces of meat, a. a first section having means for cleaning one side of the meat, b. a second section having means for cleaning the other side of the meat, c. a rotational power source located in one of said sections, d. said cleaning means in each of said sections comprising a rotatable cylinder driven by said power source for engaging and conveying meat between said sections, and rotatable scraping means having its periphery driven by said power source in opposition to the direction of meat travel between said sections for scraping residue from the meat, e. journal means supporting said second section for pivotal movement relative to the first section, said journal means being hollow essentially at the rotational axis thereof, f. a shaft essentially concentric with and extending through said hollow journal means into each of said sections, said shaft including a driven element at each end thereof, and g. drive means in each said section operationally connecting said power source to said cylinders and scraping means, the connection from the one section to the cylinder and scraping means in the other section being through said shaft and driven elements.

9. The meat cleaning machine of claim 8 wherein each of said cylinders is provided with driven means at the periphery thereof, and wherein said cylinders are driven from said driven means at substantially the same surface speeds.

10. The meat cleaning machine of claim 9 further comprising means locating the axis of said journal means and shaft sufficiently remote from said cylinders to render insignificant the resultant speed differences between said cylinders during relative pivotal action of said sections, so that such speed differences have essentially no detrimental affect on meat travelling between the cylinders.

11. In a power driven meat scraping machine for cleaning accumulated residue from the sawed faces of a piece of meat, the machine including a first section for cleaning one side of the meat, a second section mounted relative to the first section for cleaning the other side of the meat, and at least one rotational power source located in the first section, the improvement comprising:

a. means mounting the first and second sections for pivoted rotational movement relative to one another and gravitational bias toward one another, b. power drive connecting means within said mounting means mechanically connecting the output of the power source in the first section to the second section, and c. means for causing the net torque transmitted to the second section by said drive connecting means to tend to rotate the second section about said mounting means toward the first section.

* * * * *

UNITED STATES PATENT AND TRADEMARK OFFICE
CERTIFICATE OF CORRECTION

PATENT NO. : 3,977,035
DATED : August 31, 1976
INVENTOR(S) : Herbert R. Crane

It is certified that error appears in the above—identified patent and that said Letters Patent are hereby corrected as shown below:

Col. 2, line 21 "553,041" should be --535,041--.

Col. 5, line 37 "increase" should be --increases--.

Col. 6, line 55 insert --being-- before "attached".

Col. 6 line 55 "an" should be --and--.

Signed and Sealed this

Fourteenth Day of December 1976

[SEAL]

Attest:

RUTH C. MASON
Attesting Officer

C. MARSHALL DANN
Commissioner of Patents and Trademarks